(12) United States Patent
Lee et al.

(10) Patent No.: US 10,192,291 B2
(45) Date of Patent: Jan. 29, 2019

(54) METHOD AND APPARATUS FOR PERFORMING ANTI-ALIASING IN PATH RENDERING

(71) Applicant: Samsung Electronics Co., Ltd., Suwon-si (KR)

(72) Inventors: Jaedon Lee, Yongin-si (KR); Jeongjoon Yoo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 98 days.

(21) Appl. No.: 15/157,923

(22) Filed: May 18, 2016

(65) Prior Publication Data

US 2016/0379342 A1 Dec. 29, 2016

(30) Foreign Application Priority Data

Jun. 23, 2015 (KR) .................. 10-2015-0088782

(51) Int. Cl.
*G06T 5/00* (2006.01)
*G06T 11/20* (2006.01)
*G06T 7/13* (2017.01)

(52) U.S. Cl.
CPC .............. *G06T 5/002* (2013.01); *G06T 7/13* (2017.01); *G06T 11/203* (2013.01); *G06T 2207/20021* (2013.01)

(58) Field of Classification Search
CPC ..... G06T 15/06; G06T 11/40; G06T 2210/12; G06T 11/203; G06T 15/005; G06T 17/005; G06T 11/001; G06T 15/205; G06T 15/30; G06T 15/405; G06T 17/10; G06T 1/20; G06T 11/20; G06T 15/10; G06T 2207/20021; G06T 2210/21; G06T 2210/52; G06T 5/002; G06T 7/13
See application file for complete search history.

(56) References Cited

U.S. PATENT DOCUMENTS

| | | | |
|---|---|---|---|
| 8,269,788 B2 | 9/2012 | Tuomi | |
| 8,704,830 B2 | 4/2014 | Kilgard et al. | |
| 2002/0145616 A1* | 10/2002 | Doan | G06T 11/40 345/629 |
| 2003/0016221 A1 | 1/2003 | Long et al. | |
| 2006/0244748 A1* | 11/2006 | Long | G06T 11/40 345/422 |
| 2007/0109318 A1* | 5/2007 | Tuomi | G06T 11/203 345/611 |
| 2011/0234609 A1* | 9/2011 | Cai | G06T 11/40 345/581 |

(Continued)

FOREIGN PATENT DOCUMENTS

| | | | |
|---|---|---|---|
| EP | 1058912 A1 * | 12/2000 | ............... G06T 5/20 |
| JP | 2006-338692 A | 12/2006 | |

(Continued)

*Primary Examiner* — Sultana M Zalalee
(74) *Attorney, Agent, or Firm* — Harness, Dickey & Pierce, P.L.C.

(57) ABSTRACT

A method and corresponding apparatus to perform path rendering include selecting a pixel through which a path passes from among pixels included in a frame, using geometric information of the pixels in the frame. The method and corresponding apparatus include setting sub-samples for the selected pixel, and calculating a winding number of the selected pixel using the sub-samples.

17 Claims, 10 Drawing Sheets

(56) References Cited

U.S. PATENT DOCUMENTS

| | | | |
|---|---|---|---|
| 2013/0141445 A1 | 6/2013 | Engh-Halstvedt et al. | |
| 2014/0043342 A1* | 2/2014 | Goel | G06T 9/00 345/501 |
| 2015/0022546 A1* | 1/2015 | Perry | G06T 5/001 345/611 |
| 2015/0310636 A1* | 10/2015 | Yoo | G06T 5/009 345/593 |

FOREIGN PATENT DOCUMENTS

| | | |
|---|---|---|
| JP | 2013-137756 A | 7/2013 |
| KR | 10-2007-0111558 A | 11/2007 |
| KR | 10-2008-0040608 A | 5/2008 |
| KR | 10-2010-0055825 A | 5/2010 |
| KR | 10-2011-0136059 A | 12/2011 |
| KR | 10-2014-0103626 A | 8/2014 |

\* cited by examiner

METHOD AND APPARATUS FOR PERFORMING ANTI-ALIASING IN PATH RENDERING

CROSS-REFERENCE TO RELATED APPLICATION

This application claims the benefit under 35 USC 119(a) of Korean Patent Application No. 10-2015-0088782, filed on Jun. 23, 2015, in the Korean Intellectual Property Office, the disclosure of which is incorporated herein in its entirety by reference.

BACKGROUND

1. Field

The following description relates to apparatuses and methods to perform anti-aliasing in path rendering.

2. Description of the Related Art

Methods to improve acceleration performance of a graphics processing unit (hereinafter referred to as a GPU) when vector graphics or path rendering are executed are being studied. In a case of the path rendering, input data is configured as a combination of commands and primitive constituents, such as vertices, instead of rendering primitives, such as triangles. Accordingly, the path rendering performed using such input data makes it difficult to improve the acceleration performance of the GPU.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to perform path rendering, including: selecting a pixel through which a path passes from among pixels included in a frame, using geometric information of the pixels in the frame; setting sub-samples for the selected pixel; and calculating a winding number of the selected pixel using the sub-samples.

The selecting may include selecting the pixel using information corresponding to edges of each of the pixels in the frame.

The selecting further may include selecting the pixel based on whether the edges of each of the pixels in the frame form intersections with the path.

The selecting may include selecting the pixel using information corresponding to vertices of each of the pixels in the frame.

The selecting further may include selecting the pixel based on whether winding numbers calculated at the vertices are the same.

The selecting may include selecting the pixel through which the path passes by representing each of four edges forming the pixel using a linear equation.

When two edges of the pixel and the path form intersections, the selecting may determine that the path passes through the pixel.

The method may also include grouping the pixels in the frame into pixel blocks, wherein the selecting may include selecting a pixel block through which the path passes, from among the pixel blocks, using geometric information of each of the pixel blocks.

The geometric information of each of the pixel blocks may include information corresponding to edges of each of the pixel blocks or information corresponding to vertices of each of the pixel blocks.

The selecting further may include dividing a pixel block through which the path passes into sub-blocks; and selecting a sub-block through which the path passes from among the sub-blocks using geometric information of each of the sub-blocks.

The calculating may include calculating winding numbers of the sub-samples based on positions of the sub-samples and a position and a traveling direction of the path; and combining the winding numbers of the sub-samples to calculate a path rotation direction count for the selected pixel.

In accordance with an embodiment, there is provided a computer program embodied on a non-transitory computer readable medium, the computer program being configured to control a processor to perform the method described above.

In accordance with an embodiment, there is provided an apparatus to perform path rendering, including: a selecting unit configured to select a pixel through which a path passes from among pixels included in a frame, using geometric information of the pixels in the frame; and a calculating unit configured to set sub-samples for the selected pixel and calculate a winding number of the selected pixel using the sub-samples.

The selecting unit may select the pixel using information corresponding to edges of each of the pixels in the frame.

The selecting unit may select the pixel based on whether the edges included in each of the pixels in the frame form intersections with the path.

The selecting unit may select the pixel using information corresponding to vertices of each of the pixels in the frame.

The selecting unit may select the pixel based on whether winding numbers calculated at the vertices are the same.

The selecting unit may select the pixel through which the path passes by representing each of four edges forming the pixel using a linear equation.

When two edges of the pixel and the path form intersections, the selecting unit may determine that the path passes through the pixel.

The apparatus may also include a dividing unit configured to group pixels in the frame into pixel blocks, wherein the selecting unit may select a pixel block through which the path passes, from among the pixel blocks, using geometric information of each of the pixel blocks.

The geometric information of each of the pixel blocks may include information corresponding to edges of each of the pixel blocks or information corresponding to vertices of each of the pixel blocks.

The apparatus may also include the dividing unit dividing a pixel block through which the path passes into sub-blocks, and wherein the selecting unit selecting a sub-block through which the path passes from among the sub-blocks using geometric information of each of the sub-blocks.

The apparatus may also include the calculating unit calculating winding numbers of the sub-samples based on positions of the sub-samples and a position and a traveling direction of the path, and the calculating unit combining the winding numbers of the sub-samples to calculate the winding number of the selected pixel.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections. Thus, a first element, component, region, layer or section discussed below could be termed a second element, component, region, layer or section without departing from the teachings description of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the various embodiments will be described in detail with reference to the drawings.

Figure 1:
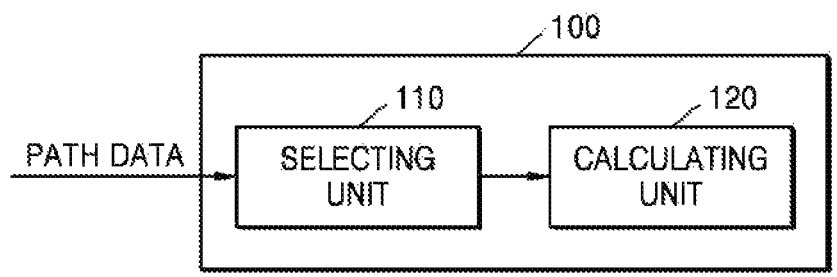
FIG. 1 illustrates an example of a rendering apparatus, according to an embodiment.

FIG. 1 illustrates an example of a rendering apparatus, according to an embodiment.

Referring to FIG. 1, the rendering apparatus 100 includes a selecting unit 110 and a calculating unit 120.

The selecting unit 110 selects at least one pixel through which a path passes, from among pixels included in a frame, using geometric information of each of the pixels included in the frame. The path is a line or a curve forming an object to be rendered. The object may include a closed polygon or a closed path formed through a connection to at least one path. In addition, the path is referred to as a primitive. Accordingly, hereinafter, the path and primitive are assumed to be the same target. The frame includes a plurality of pixels. For example, the frame is a screen on which the object is output.

The geometric information of the pixel is information corresponding to edges of the pixel or information corresponding to vertices of the pixel. In one embodiment, the information corresponding to the edges of the pixel are represented by linear equations indicative of the edges of the pixel. In addition, the information corresponding to the vertices of the pixel are represented by coordinates of the vertices. However, in addition to the linear equations or the coordinates of the vertices described above, any information indicating a shape and a position of the pixel is included in the geometric information of the pixel.

For example, the selecting unit 110 receives path data from an external apparatus and selects a pixel through which a path passes based on a position of the path indicated by the path data. In one embodiment, the external apparatus is a memory included in the rendering apparatus 100 or a memory or central processing unit (CPU) located outside the rendering apparatus 100.

The path data includes information about coordinates of each of a plurality of vertices included in the path and commands to combine the vertices to configure a path. In an embodiment, the vertices include a vertex corresponding to a start position of the path or a vertex corresponding to an end position of the path.

For example, when a straight line from a first pixel to a second pixel among the pixels included in the frame is assumed to be a path, the vertices are points corresponding to each of the first and second pixels in the frame. Accordingly, the path data includes coordinates of a first vertex corresponding to the first pixel, coordinates of a second vertex corresponding to the second pixel, and a command to configure a straight line from the first vertex to the second vertex. Accordingly, when the path data is referenced, information about a position, a traveling direction of the path, and information about coordinates of each of the vertices forming the path are defined. In addition, the path data may also include information about color values set in the pixels.

The calculating unit 120 sets a plurality of sub-samples for a selected pixel. The sub-sample serves as a point to be set within the pixel. The calculating unit 120 sets a sub-sample at a predetermined position within the pixel.

In addition, the calculating unit 120 calculates a winding number of a pixel using the sub-samples. For example, the calculating unit 120 calculates a winding number of each of the sub-samples in consideration of the positions of the sub-samples within the pixel and a position of a path passing through the pixel. In addition, the calculating unit 120 combines winding numbers of the sub-samples to calculate the winding number of the pixel.

According to the above description, the rendering apparatus 100 sets a plurality of sub-samples for pixels through which the path passes among pixels included in a frame. Accordingly, the rendering apparatus 100 efficiently prevents aliasing from occurring when an object is output in the frame. Hereinafter, an operation of the rendering apparatus 100 will be described in detail with reference to FIG. 2.

Figure 2:
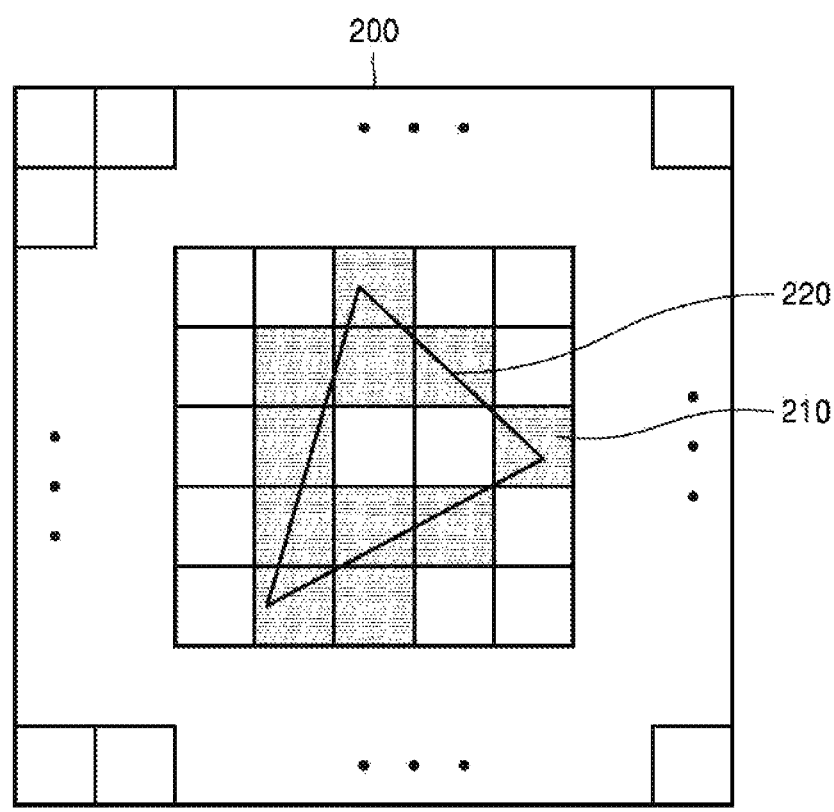
FIG. 2 illustrates an example in which the rendering apparatus operates, according to an embodiment.

FIG. 2 illustrates an example in which the rendering apparatus operates, according to an embodiment.

In FIG. 2, a frame 200 including a plurality of pixels 210 is illustrated. The rendering apparatus 100 selects pixels 210 through which a path 220 passes from among pixels included in the frame 200 and sets a plurality of sub-samples for each of the pixels 210. Accordingly, winding numbers of the pixels 210 are calculated using the sub-samples and winding numbers of the remaining pixels other than the pixels 210 in the frame 200 are calculated using single sub-samples.

Accordingly, the number of pixels for which the sub-samples are set is minimized and the cost, including, time and power, necessary to operate the rendering apparatus 100 is significantly reduced.

On the other hand, when the path rendering is performed, aliasing may occur in pixels corresponding to an outline of the object. In other words, the aliasing may occur in pixels through which the path passes. The rendering apparatus 100 correctly selects the pixels 210 through which the path 220 passes from among the pixels included in the frame 200 using geometric information of the pixels. The rendering apparatus 100 calculates winding numbers of the selected pixels using sub-samples. Accordingly, the rendering apparatus 100 effectively prevents aliasing from occurring when path rendering is performed.

Hereinafter, an example in which the rendering apparatus 100 operates will be described in detail with reference to FIGS. 3 to 14.

Figure 3:
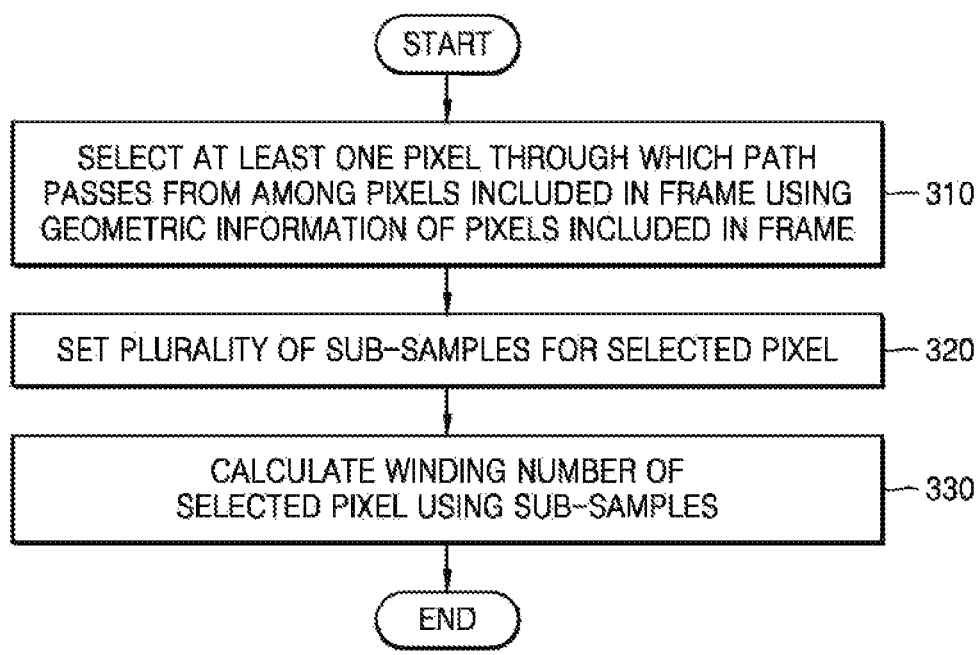
FIG. 3 is a flowchart illustrating an example of a method of performing path rendering, according to an embodiment.

FIG. 3 is a flowchart illustrating an example of a method of performing path rendering, according to an embodiment.

Referring to FIG. 3, a method of performing the path rendering includes operations to be processed in the rendering apparatus 100 illustrated in FIG. 1. Accordingly, the content described above in relation to the rendering apparatus 100 illustrated in FIG. 1 will be omitted below, but may also be applied to a method of performing the path rendering of FIG. 3.

In operation 310, the selecting unit 110 selects at least one pixel through which a path passes from among pixels included in a frame using geometric information of the pixels included in the frame.

As an example, the selecting unit 110 selects a pixel through which the path passes using information corresponding to edges of each of the pixels included in the frame. For example, the selecting unit 110 selects a pixel through which the path passes by representing each of four edges constituting the pixel using a linear equation. An example in which the selecting unit 110 selects the pixel, through which the path passes using the information corresponding to the edges of the pixel, will be described below with reference to FIG. 4.

As another example, the selecting unit 110 selects the pixel through which the path passes using information corresponding to vertices of each of the pixels included in the frame. For example, the selecting unit 110 calculates winding numbers at four vertices forming the pixel and selects the pixel through which the path passes based on whether all the winding numbers calculated at the four vertices are the same. An example in which the selecting unit 110 selects the pixel through which the path passes, using the information corresponding to the vertices of the pixel, will be described below with reference to FIGS. 5A to 6.

Figure 4:
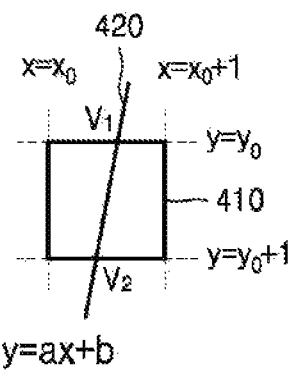
FIG. 4 illustrates an example in which a selecting unit operates according to an embodiment.

FIG. 4 illustrates an example in which the selecting unit operates according to an embodiment.

In FIG. 4, one pixel 410 included in the frame and a path 420 passing through the pixel 410 are illustrated.

The selecting unit 110 determines whether the path 420 passes through the pixel 410 using information about four edges constituting the pixel 410. In other words, when two edges of the pixel 410 and the path 420 form intersections $V_1$ and $V_2$, the selecting unit 110 determines that the path 420 passes through the pixel 410.

For example, the selecting unit 110 represents the four edges of the pixel 410 using linear equations. Referring to FIG. 4, the selecting unit 110 represents a left edge of the pixel 410 by $x=x_0$, represents a right edge of the pixel 410 by $x=x_0+1$, represents an upper edge of the pixel 410 by $y=y_0$, and represents a lower edge of the pixel 410 by $y=y_0+1$. In an embodiment, $x_0$ and $y_0$ are constants and are determined based on an arrangement of pixels included in the frame.

In addition, the selecting unit 110 represents the path 420 by a linear $y=ax+b$. The path data includes information about coordinates of each of vertices included in the path and commands for a path to be configured or defined through a combination of the vertices. Accordingly, the selecting unit 110 refers to the path data that represents the path 420 using a linear equation.

The selecting unit 110 determines whether the edges of the pixel 410 and the path 420 form the intersections $V_1$ and $V_2$ using the equations indicating the edges of the pixel 410 and the equation indicating the path 420.

When the edges of the pixel 410 and the path 420 form the intersections $V_1$ and $V_2$, the selecting unit 110 stores coordinates of the intersections $V_1$ and $V_2$ in a memory (not illustrated). When the edges of the pixel and the path do not form the intersections, the selecting unit 110 stores information defining or indicating whether there is a path in either side of a pixel in the memory (not illustrated). Accordingly, the selecting unit 110 selects a pixel through which the path passes from among pixels included in a frame using the information stored in the memory (not illustrated).

On the other hand, in an example, the two edges of the pixel 410 and the path 420 form the intersections $V_1$ and $V_2$, as illustrated in FIG. 4. However, the selecting unit 110 is configured to be able to determine that the path passes through the pixel, even when one edge of the pixel and the path forms an intersection.

Figure 5A:
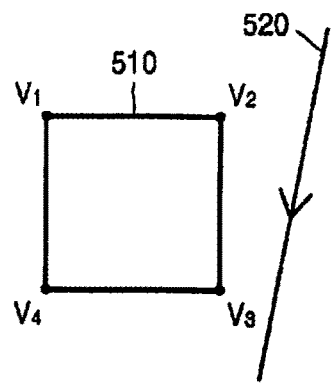
FIGS. 5A to 5C illustrate another example in which a selecting unit operates, according to an embodiment.
Figure 5B:
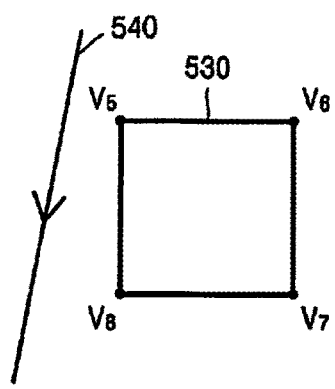
Figure 5C:
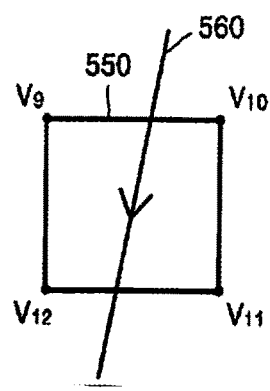

FIGS. 5A to 5C illustrate another example in which a selecting unit operates, according to an embodiment.

In FIGS. 5A to 5C, pixels 510, 530, and 550 included in the frame and paths 520, 540, and 560 are illustrated.

The selecting unit 110 determines whether the paths 520, 540, and 560 pass through the pixels 510, 530, and 550 using information corresponding to vertices of the pixels 510, 530, and 550. For example, the selecting unit 110 calculates winding numbers considering or based on positions and traveling directions of the paths 520, 540, and 560 at the vertices of the pixels 510, 530, and 550.

The winding number is a value indicating a direction in which a path rotates when one side direction is viewed at one vertex. If there are two or more paths when one side direction is viewed at one vertex, values corresponding to the paths are accumulated to determine the winding number based on such accumulation. In an alternative embodiment, if there are two or more paths when one side direction is viewed at one of the vertices, the values corresponding to the paths are accumulated and averaged to determine the winding number.

For example, the winding number is calculated by adding a predetermined value to a default value (for example, 0) when the path rotates in a clockwise direction and subtracting the predetermined value from the default value when the path rotates in a counterclockwise direction. However, the embodiments are not limited thereto. In other words, the winding number may be calculated by subtracting the predetermined value from the default value when the path rotates in the clockwise direction and adding the predetermined value to the default value when the path rotates in the counterclockwise direction.

In FIGS. 5A to 5C, in one illustrative embodiment, a description is presented in which the selecting unit 110 adds "1" to the default value when the path located on the right of the vertex rotates in the clockwise direction, and subtracts "1" from the default value when the path located on the right of the vertex rotates in the counterclockwise direction. In addition, in accord with the illustrative embodiment, the default value is 0 and the paths 520, 540, and 560 travel from the top to the bottom.

Referring to FIG. 5A, the path 520 is located on the right of the first vertex $V_1$ of the pixel 510 and the path 520 rotates in the clockwise direction. In other words, the path 520 is defined from the top to the bottom. Accordingly, the selecting unit 110 calculates the winding number of the first vertex $V_1$, as "1." In this manner, the selecting unit 110 calculates each of the winding numbers of the second vertex $V_2$, the third vertex $V_3$, and the fourth vertex $V_4$ as "1."

Consequently, all the winding numbers of the first vertex $V_1$ to the fourth vertex $V_4$ of the pixel 510 are "1." Accordingly, the selecting unit 110 determines that the path 520 does not pass through the pixel 510.

Referring to FIG. 5B, the path 540 is located on the left of a first vertex $V_5$ of the pixel 530. In other words, there is no path on the right of the pixel 530. Accordingly, the selecting unit 110 calculates the winding numbers of the first vertex $V_5$ to the fourth vertex $V_8$ of the pixel 530 as "0." That is, all the winding numbers of the first vertex $V_5$ to the fourth vertex $V_8$ of the pixel 530 are "0." Accordingly, the selecting unit 110 determines that the path 540 does not pass through the pixel 530.

Referring to FIG. 5C, the path 560 is located on the right of a first vertex $V_9$ and a fourth vertex $V_{12}$ of the pixel 550. The path 560 rotates in the clockwise direction, that is, from the top to the bottom. Accordingly, the selecting unit 110 calculates the winding numbers of the first vertex $V_9$ and the fourth vertex $V_{12}$ as "1." In addition, there is no path on the right of a second vertex $V_{10}$ and a third vertex $V_{11}$. Accordingly, the selecting unit 110 calculates the winding numbers of the second vertex $V_{10}$ and the third vertex $V_{11}$ as "0."

As described above, the winding numbers of the first vertex $V_9$ to the fourth vertex $V_{12}$ of the pixel 550 are different. Accordingly, the selecting unit 110 determines that the path 560 passes through the pixel 550.

According to the scheme described above with reference to FIGS. 5A to 5C, the selecting unit 110 calculates the winding numbers at the vertices of each of pixels included in a frame and stores the calculated winding numbers in the memory (not illustrated). Accordingly, the selecting unit 110 selects a pixel, through which the path passes, from among pixels included in the frame using information stored in the memory (not illustrated).

On the other hand, an example in which the selecting unit 110 operates when the paths 520, 540, and 560 are lines is illustrated in FIGS. 5A to 5C. However, when the path is a curve, the selecting unit 110 selects a pixel through which the path passes from among pixels included in the frame.

Figure 6:
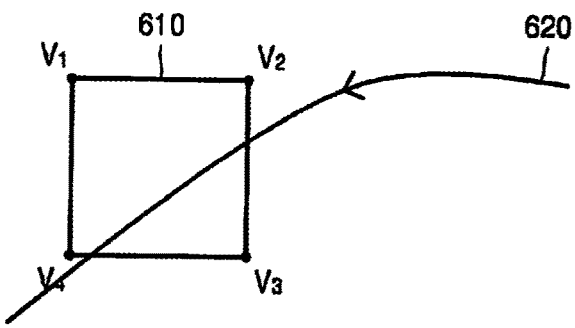
FIG. 6 illustrates a still another example in which a selecting unit operates, according to an embodiment.

FIG. 6 illustrates a still another example in which a selecting unit operates, according to an embodiment.

In FIG. 6, a pixel 610 included in the frame and a path 620 which is a curve are illustrated. In one embodiment, the selecting unit 110 adds "1" to the default value when the path located on the right of the vertex rotates in the clockwise direction and subtracts "1" from the default value when the path located on the right of the vertex is rotates in the counterclockwise direction. In addition, the default value is "0" and the path 620 passing through the pixel travels from the top to the bottom. A person of skill in the relevant art will appreciate that, in an alternative embodiment, the selecting unit 110 can add "1" to the default value when the path located on the right of the vertex rotates in the counterclockwise direction and subtract "1" from the default value when the path located on the right of the vertex is rotates in the clockwise direction. In addition, the default value is "0" and the path 620 passing through the pixel travels from the bottom to the top. However, for illustrative purposes only, the one embodiment will be discussed. The path 620 is located on the right of the first vertex $V_1$, the second vertex $V_2$ and the fourth vertex $V_4$ of the pixel 610. In addition, the path 620 rotates in the clockwise direction, for instance, from the top to the bottom. Accordingly, the selecting unit 110 calculates winding numbers of the first vertex $V_1$, the second vertex $V_2$ and the fourth vertex $V_4$ as "1." In addition, there is no path on the right of the third vertex $V_3$ of the pixel 610. Accordingly, the selecting unit 110 calculates the winding number of the third vertex $V_3$ as "0."

As described above, the winding numbers of the first vertex $V_1$, to the fourth vertex $V_4$ of the pixel 610 are different. Accordingly, the selecting unit 110 determines that the path 620 passes through the pixel 610.

Referring back to FIG. 3, in operation 320, the calculating unit 120 sets sub-samples for the selected pixel. In other words, the calculating unit 120 sets the sub-samples within a pixel through which the path passes. At this time, positions of the sub-samples are predetermined.

In operation 330, the calculating unit 120 calculates the winding number of the selected pixel using the sub-samples. In other words, the calculating unit 120 calculates the winding number of the pixel through which the path passes using the sub-samples and calculates the winding number of the pixel through which no path passes using a single sub-sample.

Hereinafter, an example in which the calculating unit 120 operates will be described in detail with reference to FIGS. 7A and 7B.

Figure 7A:
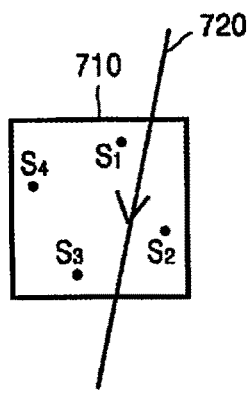
FIGS. 7A and 7B illustrate an example in which a calculating unit operates, according to an embodiment.
Figure 7B:
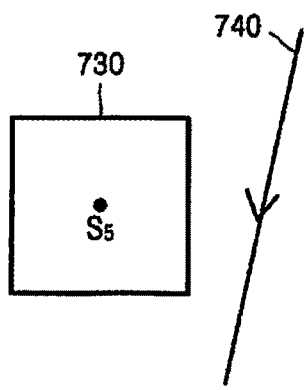

FIGS. 7A and 7B illustrate an example in which the calculating unit operates according to an exemplary embodiment.

FIG. 7A illustrates an example in which the calculating unit 120 operates when a path 720 passes through a pixel 710, and FIG. 7B illustrates an example in which the calculating unit 120 operates when a path 740 does not pass a pixel 730.

Referring to FIG. 7A, the calculating unit 120 sets sub-samples $S_1$, $S_2$, $S_3$, and $S_4$ inside the pixel 710. At this time, information about positions of the sub-samples $S_1$, $S_2$, $S_3$, and $S_4$ and a number of sub-samples is pre-stored.

The calculating unit 120 calculates a winding number of each of the sub-samples $S_1$, $S_2$, $S_3$, and $S_4$. In one example, a process in which the calculating unit 120 calculates winding numbers of the sub-samples $S_1$, $S_2$, $S_3$, and $S_4$ is the same or substantially the same as described above with reference to FIGS. 5A to 6.

In detail, a path 720 is located on the right of the first sub-sample $S_1$, the third sub-sample $S_3$, and the fourth sub-sample $S_4$ of the pixel 710. In addition, the path 720 travels in the clockwise direction, for example, from the top to the bottom. Assuming that the default value of the winding number is "0," the calculating unit 120 calculates all the winding numbers of the first sub-sample $S_1$, the third sub-sample $S_3$, and the fourth sub-sample $S_4$ as "1." On the other hand, there is no path on the right of the second sub-sample $S_2$ of the pixel 710. Accordingly, the calculating unit 120 determines the default value of "0" as the winding number of the second sub-sample $S_2$.

The calculating unit 120 stores the winding numbers for the first sub-sample $S_1$, the second sub-sample $S_2$, the third sub-sample $S_3$, and the fourth sub-sample $S_4$ in the memory (not illustrated). As described below with reference to FIGS. 11 to 14, the stored winding numbers are used to determine the color of the pixel 710.

Referring to FIG. 7B, the calculating unit 120 sets one sub-sample $S_5$ inside the pixel 730. In other words, the one sub-sample $S_5$ is set for the pixel 730 through which the path 740 does not pass.

The calculating unit 120 calculates the winding number of the sub-sample $S_5$. In one example, a process in which the calculating unit 120 calculates the winding number of the sub-sample $S_5$ is the same or substantially the same as described above with reference to FIGS. 5A to 6.

In detail, the path 740 is located on the right of the sub-sample $S_5$ of the pixel 730 and the path 740 travels in the clockwise direction, for instance, from the top to the bottom. Accordingly, in response to the default value of the winding number being "0," the calculating unit 120 calculates the winding number of the sub-sample $S_5$ as "1."

On the other hand, as described with reference to FIGS. 5A to 6, the selecting unit 110 calculates the winding number of each of the vertices of the pixel and stores the calculated winding number in the memory (not illustrated). When no path passes through the pixel, the winding numbers of the vertices of the pixel are the same. In addition, the calculation of the winding number, according to the scheme described above with reference to FIG. 7B, is the same or substantially the same as the calculation of the winding number, according to the scheme described above with reference to FIGS. 5A to 6.

Accordingly, it is unnecessary for the selecting unit 110, according to the example described above with reference to FIGS. 5A to 6, to calculate the winding number again. In other words, the selecting unit 110 determines the winding number stored in the memory (not illustrated) as the winding number of the pixel through which no path passes.

Figure 8:
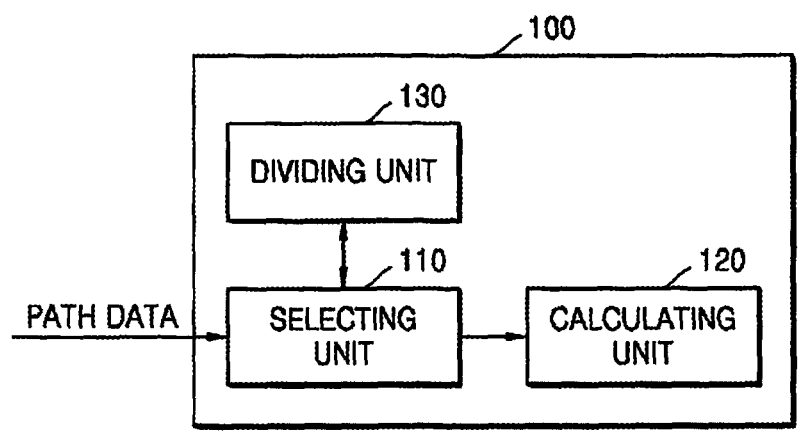
FIG. 8 illustrates another example of a rendering apparatus, according to an embodiment.

FIG. 8 illustrates another example of a rendering apparatus, according to an embodiment.

Referring to FIG. 8, the rendering apparatus 100 further includes a dividing unit 130, the selecting unit 110, and the calculating unit 120.

For example, a process in which the calculating unit 120 of FIG. 8 operates is the same as described above with reference to FIG. 7. Accordingly, hereinafter, detailed description of the calculating unit 120 will be omitted.

The dividing unit 130 groups pixels included in the frame into pixel blocks. In other words, the dividing unit 130 divides the frame into the pixel blocks. Here, the pixel block is a group of pixels.

The selecting unit 110 selects at least one pixel block, through which a path passes, from among pixel blocks using geometric information of each of the pixel blocks. In an example, the geometric information of the pixel block is information corresponding to edges of the pixel block or information corresponding to vertices of the pixel block.

As an example, the selecting unit 110 selects a pixel block through which the path passes using the information corresponding to edges of each of the pixel blocks. For example, the selecting unit 110 selects a pixel block through which the path passes by representing each of four edges forming the pixel block using a linear equation. According to a method described above with reference to FIG. 4, the selecting unit 110 selects a pixel block through which the path passes using information corresponding to edges of a pixel block.

As another example, the selecting unit 110 selects a pixel block through which the path passes using the information corresponding to the vertices of each of the pixel blocks included in the frame. For example, the selecting unit 110 calculates winding numbers at vertices corresponding to four vertices forming the pixel block and selects a pixel block through which a path passes based on whether all the winding numbers calculated at the four vertices are the same. According to the method described above with reference to FIGS. 5A to 6, the selecting unit 110 selects the pixel block through which the path passes using the information corresponding to the vertices of the pixel block.

The selecting unit 110 transmits the information about the pixel block through which the path passes to the dividing unit 130. In addition, the dividing unit 130 divides the pixel block through which the path passes into sub-blocks. In an example, the sub-block is a group of at least one pixel and a minimum unit of the sub-block is one pixel.

The selecting unit 110 selects at least one sub-block through which the path passes, from among the sub-blocks, using geometric information of each of the sub-blocks. At this time, a method in which the selecting unit 110 selects the sub-block, through which the path passes, is the same or substantially the same as the method of selecting the pixel block through which the path passes.

As described above with reference to FIG. 8, the rendering apparatus 100 divides the frame into pixel blocks and selects a pixel block through which the path passes from among the pixel blocks. In addition, the rendering apparatus 100 divides the pixel block through which the path passes into a plurality of sub-blocks and selects a sub-block through which the path passes, from among the sub-blocks.

In other words, the rendering apparatus 100 selects a pixel through which a path passes, after hierarchically dividing the frame. Accordingly, the rendering apparatus 100 selects the pixel through which the path passes more efficiently than when determining whether the path passes in units of pixels.

Hereinafter, an example in which the dividing unit 130 operates will be described in detail with reference to FIGS. 9 and 10.

Figure 9:
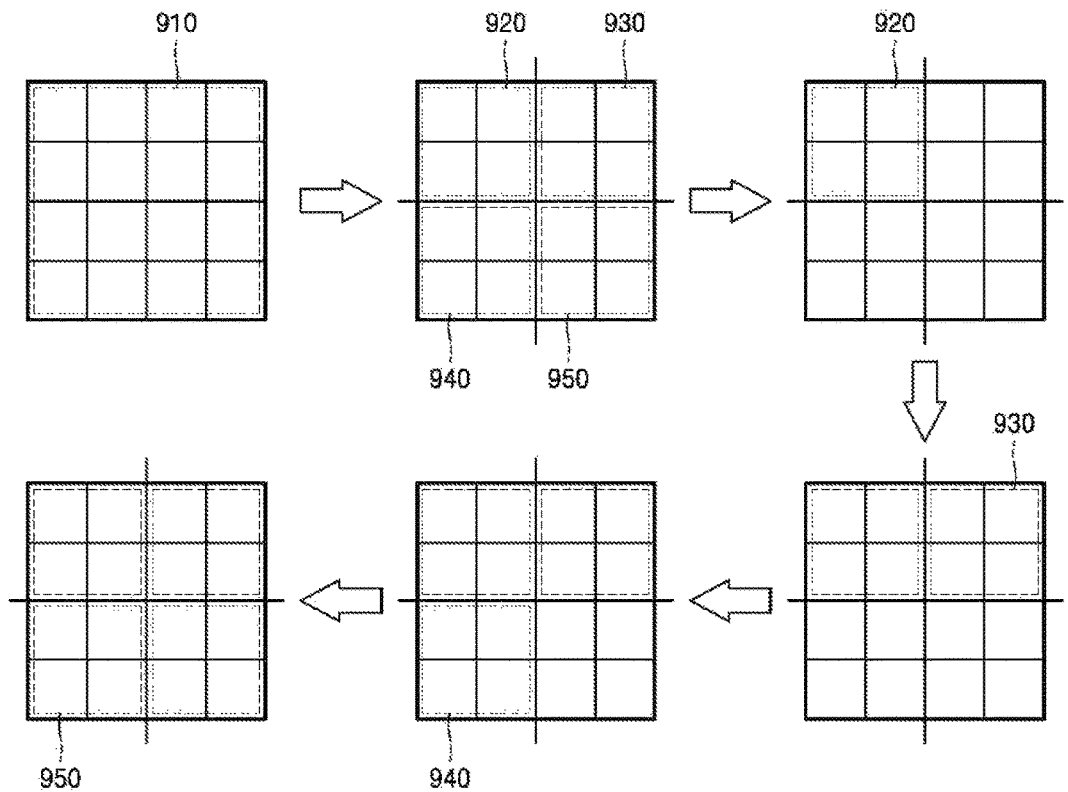
FIG. 9 illustrates an example in which a dividing unit divides a frame into pixel blocks, according to an embodiment.

FIG. 9 illustrates an example in which the dividing unit divides a frame into pixel blocks, according to an embodiment.

In FIG. 9, a frame 910 is composed of 4*4 pixels. On the other hand, the number of pixels included in the frame 910 is not limited to 16. The frame 910 may be composed of more or less pixels. In addition, although not illustrated in FIG. 9, it is assumed that a rendered object is output in the frame 910.

The dividing unit 130 divides the frame 910 into pixel blocks 920, 930, 940, and 950. For example, when the dividing unit 130 divides the frame 910 into units of pixel blocks, each having 2*2 pixels, a total of the four pixel blocks 920, 930, 940, and 950 are formed in the frame 910.

The selecting unit 110 selects at least one pixel block through which the path passes using the geometric information of each of the pixel blocks 920, 930, 940, and 950. For example, the selecting unit 110 selects the pixel block through which the path passes, while sequentially considering the pixel blocks 920, 930, 940, and 950. The selecting unit 110 determines whether the path passes through the first pixel block 920. Thereafter, the selecting unit 110 determines whether the path passes through a pixel block in the order of the second pixel block 930, the third pixel block 940, and the fourth pixel block 950. However, in accordance with an alternative embodiment, the selecting unit 110 may determine the pixel block that the path passes in an alternative order, such as the fourth pixel block 950, the third pixel bock 940, and the second pixel block 930.

When the path passes through, for example, the first pixel block 920, the selecting unit 110 transmits information about the first pixel block 920 to the dividing unit 130. In addition, the dividing unit 130 divides the first pixel block 920 into sub-blocks. In this manner, the dividing unit 130, in one example, hierarchically divides the frame 910, so that the frame 910 is divided up to one pixel unit.

Figure 10:
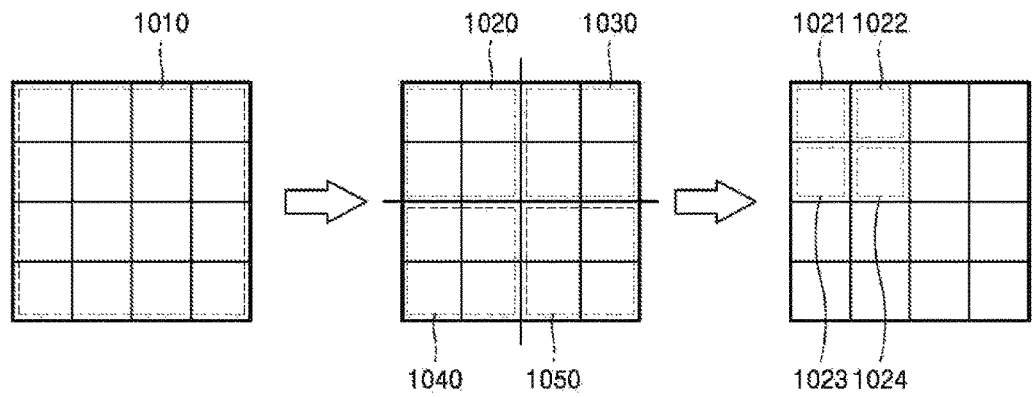
FIG. 10 illustrates an example in which the dividing unit hierarchically divides the frame, according to an embodiment.

FIG. 10 illustrates an example in which the dividing unit hierarchically divides the frame, according to an embodiment.

In FIG. 10, a frame 1010 is formed of 4*4 pixels. The process in which the dividing unit 130 divides the frame 1010 into pixel blocks 1020, 1030, 1040, and 1050 is the same or substantially the same as described above with reference to FIGS. 8 to 9.

When the path, for example, passes through the first pixel block 1020, the dividing unit 130 divides the first pixel block 1020 into sub-blocks 1021, 1022, 1023, and 1024. In addition, the selecting unit 110 determines whether a path passes through each of the sub-blocks 1021, 1022, 1023, and 1024.

As described above with reference to FIGS. 9 and 10, the rendering apparatus 100 divides a pixel block through which the path passes into blocks of smaller units. Accordingly, the operation of the rendering apparatus 100 is efficient because it is unnecessary to determine whether a path passes through every pixel included in the frame.

The rendering apparatus 100, described above with reference to FIGS. 1 to 10, may be implemented by a processor module included in the GPU or an apparatus separate from the GPU.

Figure 11:
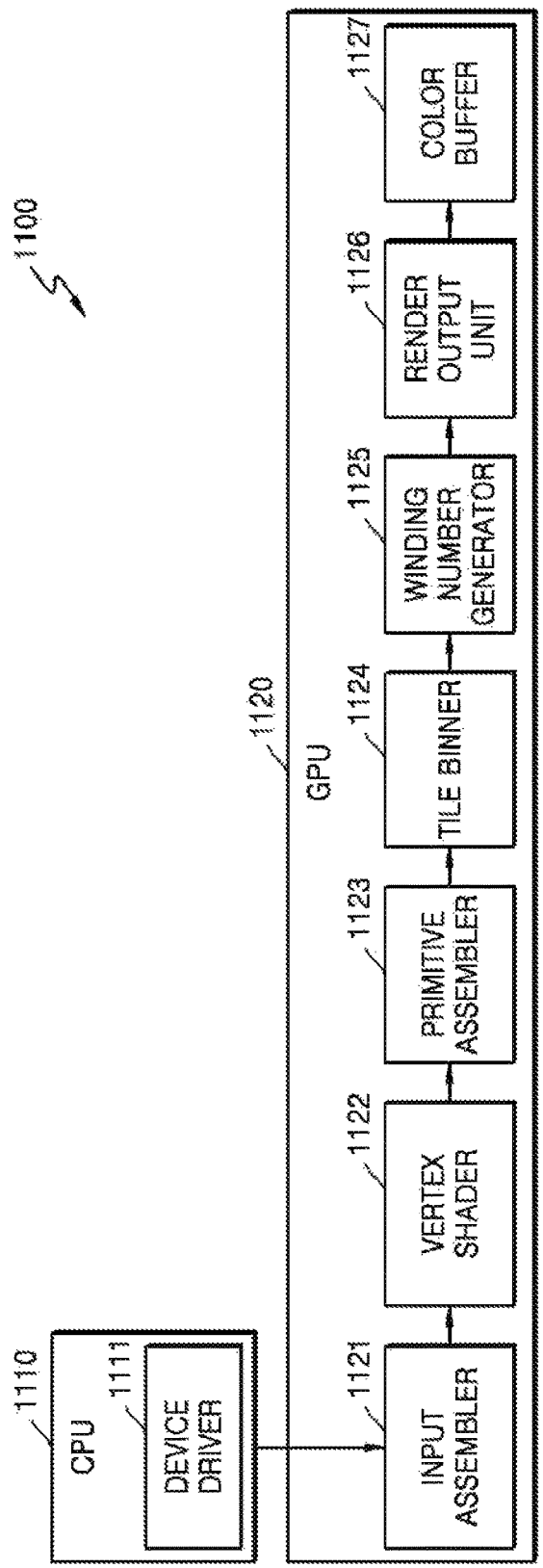
FIG. 11 illustrates an example of a rendering system, according to an embodiment.

FIG. 11 illustrates an example of a rendering system, according to an embodiment.

Referring to FIG. 11, a rendering system 1100 includes a CPU 1110 and a GPU 1120. In addition, the CPU 1110 includes a device driver 1111, and the GPU 1120 includes processor modules 1121, 1122, 1123, 1124, 1125, 1126, and 1127 that perform path rendering. In accordance with an embodiment, the processor modules 1121, 1122, 1123, 1124, 1125, 1126, and 1127 are illustrated as separate processors. However, a person skill in the art would appreciate that all the processor modules 1121, 1122, 1123, 1124, 1125, 1126, and 1127 may be combined into a single processor module or more than one processor module performing the functions of the processor modules 1121, 1122, 1123, 1124, 1125, 1126, and 1127, to be described.

The operations of the selecting unit 110, the calculating unit 120, and the dividing unit 130 described above with reference to FIGS. 1 to 10 are performed by a winding number generator 1125 of FIG. 11. In detail, the device driver 1111 determines points based on shapes of paths forming an object. When the path is a curve, the device driver 1111 forms at least one triangle based on a positional relationship between points. In addition, the device driver 1111 stores triangle data including data about points and a triangle in a vertex buffer (not illustrated).

For example, the CPU 1110 generates path data through an application program and the device driver 1111 generates a command so that the GPU 1120 performs the path rendering.

The GPU 1120 shades pixels corresponding to a path using the path data stored in the vertex buffer (not illustrated).

For example, the GPU 1120 calculates a winding number of each of the pixels corresponding to the path and set a color in the pixel based on the calculated winding number. In addition, the GPU 1120 divides a frame into tiles and performs tile binning for each tile.

Hereinafter, an example in which the modules 1121, 1122, 1123, 1124, 1125, 1126, and 1127 included in the GPU 1120 operate will be described.

The input assembler 1121 reads data about at least one vertex forming the path from the memory and transmits the read data to the vertex shader 1122. The vertex shader 1122 executes a vertex shading code created by a user for the vertex. In other words, the vertex shader 1122 interprets a command indicating a path. For example, a shading core of the GPU performs a function of the vertex shader 1122.

The primitive assembler 1123 configures a primitive obtained by collecting vertices passing through the vertex shader 1122. In one example, as a path formed of vertices, the primitive is an element forming the object. The primitive, according to an embodiment, includes a line or a curve.

The tile binner 1124 performs tile binning. For example, the tile binner 1124 allocates an identification value of a path to tiles included in the frame. For example, the tile binner 1124 generates a list including a name of a path to be processed during tile rendering for each tile. Hereinafter, a list including the path name is referred to as a 'bin.'

The tile is a group of pixels included in a frame. For example, assuming that 1024*768 pixels are included in the frame and the frame is divided into four tiles, 512*384 pixels are included in one tile.

A path identification value indicating a path corresponds to a predetermined name. Any identification value serving as predetermined information indicating a path may be used.

In addition, the tile binner 1124 calculates an initial winding number of each of the tiles based on a position and a traveling direction of a path. However, when the tile binner 1124 does not calculate the initial winding number, the winding number generator 1125 calculates the initial winding number.

The winding number generator 1125 calculates winding numbers of pixels included in each of the tiles based on the position and the traveling direction of the path.

In addition, the winding number generator 1125 selects pixels through which a path passes from among pixels included in a frame. In addition, the winding number generator 1125 sets sub-samples for the selected pixels and calculates winding numbers of the selected pixels using the sub-samples.

In addition, the winding number generator 1125 divides a frame or tile into pixel blocks and divides a pixel block into sub-blocks. The divided pixel block is one through which a path passes among the pixel blocks after the division.

On the other hand, the case in which the winding number generator 1125 is included in the GPU 1120 is illustrated in FIG. 11, but the embodiments are not limited thereto. For instance, the winding number generator 1125 is a single apparatus independent of the GPU 1120. For example, an independent winding number generator (not illustrated) receives information about coordinates of each of vertices included in the path and information about coordinates of a pixel included in the frame from the GPU 1120. In addition, the independent winding number generator (not illustrated) calculates a winding number of the pixel using the received information and returns the calculated winding number to the GPU 1120.

Furthermore, the shading core included in the GPU 1120 or hardware independent of the GPU 1120 calculates the winding number of the pixel.

The render output unit 1126 records data, for example, information about a color of a pixel, generated according to an operation of the pixel shader in the color buffer 1127. In other words, the pixel shader determines a color of each of the pixels included in the frame and the render output unit 1126 merges information about pixel colors and records the merged information in the color buffer 1127.

For example, the pixel shader receives information about pixels included in the frame and determines a color of each of the pixels. In other words, the pixel shader performs pixel shading based on a winding number of each of the pixels. In an embodiment, the shading is a process of setting a color in each of the pixels, but is not limited thereto. For example, the shading may be a process of setting contrast in each of the pixels or a process of setting texture in each of the pixels. In addition, the pixel shader performs the pixel shading based on the texture. For example, the pixel shader determines the color of the pixel based on a preset rule.

The render output unit 1126 records information about the color of the pixel in the buffer 1127.

Figure 12:
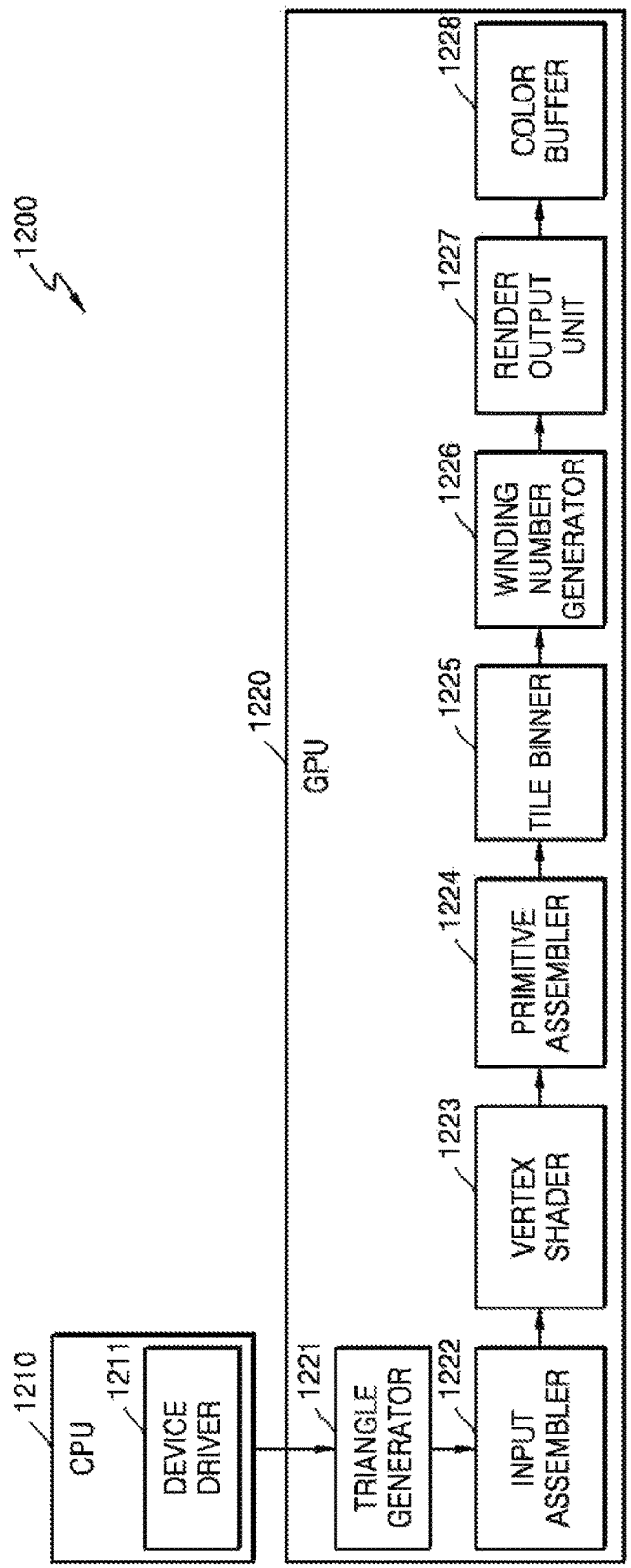
FIG. 12 illustrates another example of a rendering system, according to an embodiment.

FIG. 12 illustrates another example of a rendering system, according to an embodiment.

The rendering system 1200 illustrated in FIG. 12 further includes a triangle generator 1221 in a GPU 1220 when compared with the rendering system 1100 illustrated in FIG. 11. In other words, the device driver 1211 of FIG. 12 delegates a triangle generator 1221 of the GPU 1220 to perform a triangle formation process performed by the device driver 1111 of FIG. 11.

On the other hand, excluding the above-described triangle formation process from being performed, for example, an operation of the device driver 1211 of FIG. 12 is the same or substantially the same as that of the device driver 1111 of FIG. 11. Accordingly, detailed descriptions of a CPU 1210 and the device driver 1211 will be omitted below.

In addition, for example, operations of modules 1222, 1223, 1224, 1225, 1226, 1227, and 1228 included in the GPU 1220 of FIG. 12 are the same or substantially the same as those of the modules 1121, 1122, 1123, 1124, 1125, 1126, and 1127 included in the GPU 1120 of FIG. 11. Accordingly, detailed description of the GPU 1220 will be omitted below.

Hereinafter, an example in which the winding number generator 1125 or 1226 operates will be described with reference to FIGS. 13 and 14.

Figure 13:
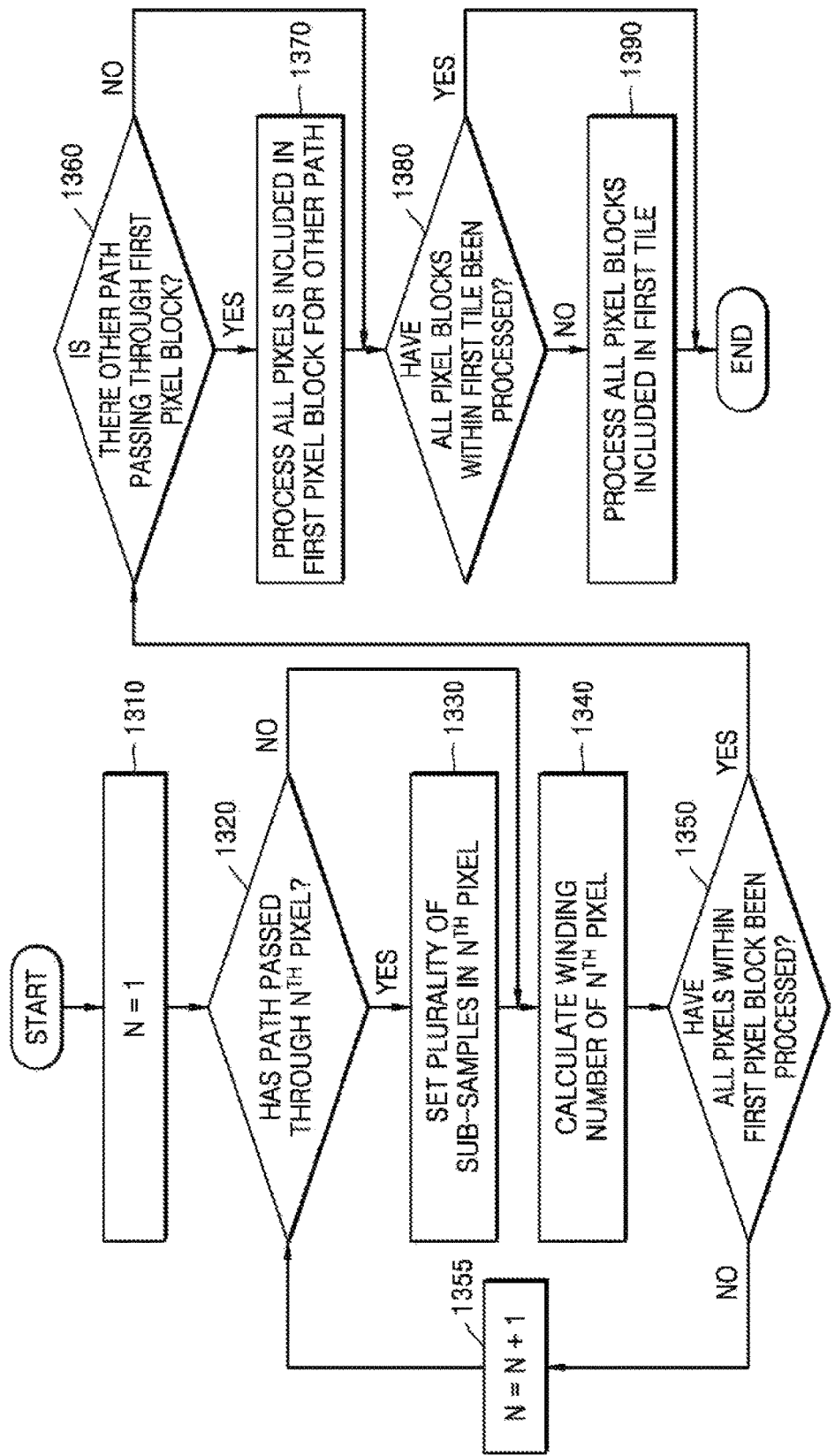
FIG. 13 is a flowchart illustrating an example in which a winding number generator operates, according to an embodiment.

FIG. 13 is a flowchart illustrating an example in which a winding number generator operates, according to an embodiment.

Referring to FIG. 13, the winding number generator 1125 or 1226 performs operations to be processed chronologically in the rendering apparatus 100 illustrated in FIGS. 1 and 8. Accordingly, the content described above in relation to the rendering apparatus 100 illustrated in FIGS. 1 and 8 will be omitted below, but may also be applied to the flowchart of FIG. 13.

The winding number generator 1125 or 1226 calculates winding numbers in units of pixel blocks. That is, the winding number generator 1125 or 1226 processes pixel blocks included in a frame in parallel.

The frame is divided into a plurality of tiles and the tile is divided into a plurality of pixel blocks. Accordingly, in operations 1310 to 1370, the winding number generator 1125 or 1226 calculates winding numbers of pixels included in a first pixel block. In addition, in operations 1380 to 1390, the winding number generator 1125 or 1226 performs the above-described operations (that is, operations 1310 to 1370) for other pixel blocks within a first tile including the first pixel block. In addition, the winding number generator 1125 or 1226 generates winding numbers of all pixels included in the frame by performing the above-described operations (that is, operations 1310 to 1390) for other tiles included in the frame.

In operation 1310, N is set to "1." In one example, N is greater than or equal to 1 and is a natural number less than or equal to the number of pixels included in the first pixel block.

In operations 1320, the winding number generator 1125 or 1226 determines whether a path passes through a first pixel. For example, the winding number generator 1125 or 1226 determines whether the path passes through the first pixel using any one of the methods described above with reference to FIGS. 4 to 6. When the path passes through the first pixel, the process proceeds to operation 1330. Otherwise, the process proceeds to operation 1340.

In operation 1330, the winding number generator 1125 or 1226 sets sub-samples in the first pixel. At this time, information about a position of each of the sub-samples may be pre-stored.

In operation 1340, the winding number generator 1125 or 1226 calculates the winding number of the first pixel. When the path passes through the first pixel, the winding number generator 1125 or 1226 calculates the winding number of the first pixel using the sub-samples. When the path does not pass through the first pixel, the winding number of the first pixel is calculated using a single sub-sample. For example, the winding number generator 1125 or 1226 calculates the winding number of the first pixel according to the method described above with reference to FIGS. 7A and 7B.

In operation 1350, the winding number generator 1125 or 1226 determines whether all pixels included within the first pixel block have been processed. In other words, the winding number generator 1125 or 1226 determines whether the process of operations 1310 to 1340 has been performed for all the pixels included within the first pixel block. When there is an unprocessed pixel, the process proceeds to operation 1355 to increment N by 1. When all the pixels have been processed, the process proceeds to operation 1360.

In operation 1360, the winding number generator 1125 or 1226 determines whether there is another path which passes through the first pixel block. The process described above with reference to operations 1310 to 1350 is a process of calculating winding numbers of pixels in consideration of a single path. When paths pass through the first pixel block, the winding number generator 1125 or 1226 performs operations 1310 to 1360 for each of the other paths.

In operation 1370, the winding number generator 1125 or 1226 processes all pixels included in the first pixel block for the other paths, which pass through the first pixel block. In other words, the winding number generator 1125 or 1226 calculates winding numbers of pixels in consideration of the other paths, which pass through the first pixel block.

In operation 1380, the winding number generator 1125 or 1226 determines whether all pixel blocks within the first tile have been processed. In other words, when the first tile includes pixel blocks, the winding number generator 1125 or 1226 performs operations 1310 to 1370 for each pixel block.

In operation 1390, the winding number generator 1125 or 1226 processes all pixel blocks included in the first tile. In other words, the winding number generator 1125 or 1226 calculates winding numbers of all the pixels included in the first tile.

Figure 14:
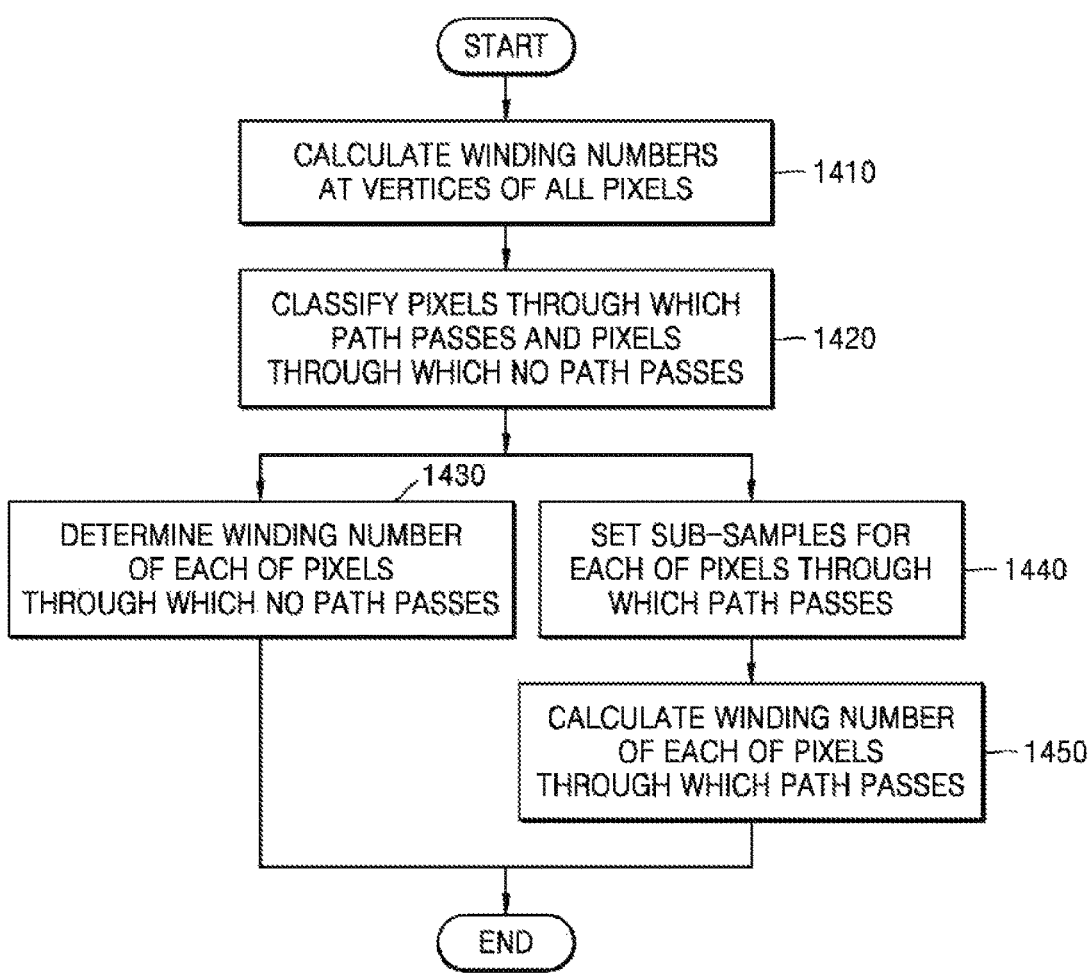
FIG. 14 is a flowchart illustrating another example in which a winding number generator operates, according to an embodiment.

FIG. 14 is a flowchart illustrating another example in which a winding number generator operates, according to an embodiment.

Rotation direction counts for all pixels included in one tile are simultaneously calculated in the flowchart illustrated in FIG. 14 in contrast with the flowchart illustrated in FIG. 13. In other words, the winding number generator 1125 or 1226 calculates winding numbers of vertices of all the pixels included in the one tile and classifies pixels through which the path passes, and pixels through which no path passes based on calculation results. In addition, the winding number generator 1125 or 1226 updates the winding number using sub-samples for the pixels through which the path passes.

In operation 1410, the winding number generator 1125 or 1226 calculates winding numbers at vertices of all pixels included in the tile. For example, the winding number generator 1125 or 1226 calculates the winding number according to the method described above with reference to FIGS. 5A to 6.

In operation 1420, the winding number generator 1125 or 1226 classifies pixels included in the tile into pixels through which the path passes and pixels through which no path passes. For example, the winding number generator 1125 or 1226 classifies the pixels based on whether all the winding numbers of the vertices included in the pixel are the same.

In step 1430, the winding number generator 1125 or 1226 determines a winding number of each of the pixels through which no path passes. When the path does not pass through the pixel, all the winding numbers of the vertices of the pixel are the same. Accordingly, the winding number generator 1125 or 1226 determines the winding number of the vertex included in the pixel as the winding number of the pixel.

In operations 1440 and 1450, the winding number generator 1125 or 1226 sets sub-samples for each of the pixels through which the path passes and calculates the winding number of the pixel using the sub-samples.

According to the above description, the rendering apparatus 100 sets sub-samples for, in one example, only pixels through which the path passes among pixels included in a frame. Accordingly, the rendering apparatus 100 efficiently prevents aliasing from occurring when an object is output in the frame.

In addition, the rendering apparatus 100 divides the frame into pixel blocks and selects a pixel block, through which the path passes, from among the pixel blocks. In addition, the rendering apparatus 100 divides the pixel block, through which the path passes, into sub-blocks and selects a sub-block through which the path passes, from among the sub-blocks.

In other words, the rendering apparatus 100 selects a pixel, through which a path passes, after hierarchically dividing the frame. Accordingly, the rendering apparatus 100 selects a pixel through which the path passes more efficiently than determining whether the path passes in units of pixels.

The apparatuses, units, modules, devices, binners, assemblers, shaders, drivers, buffers, and other components illustrated in FIGS. 1, 8, and 11-12 that perform the operations described herein with respect to FIGS. 2-7, 9-10, and 13-14 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-7, 9-10, and 13-14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-7, 9-10, and 13-14 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to perform path rendering, comprising:
    selecting a pixel through which a path passes from among pixels included in a frame, using geometric information of the pixels in the frame;
    setting sub-samples for the selected pixel, each of the sub-samples being a point to be set with the selected pixel; and
    calculating a winding number of the selected pixel using the sub-samples, the calculating the winding number of the selected pixel including,
        calculating a winding number of each of the sub-samples, and
        combining the calculated winding numbers of the sub-samples,
    wherein the selecting the pixel further includes selecting the pixel through which the path passes based on whether winding numbers calculated at vertices of each of the pixels in the frame are the same.

2. The method according to claim 1, wherein the selecting comprises:
    selecting the pixel through which the path passes using information corresponding to edges of each of the pixels in the frame.

3. The method according to claim 2, wherein the selecting further comprises:
    selecting the pixel through which the path passes based on whether the edges of each of the pixels in the frame form intersections with the path.

4. The method according to claim 1, wherein the selecting further comprises:
    selecting the pixel through which the path passes using information corresponding to the vertices of each of the pixels in the frame.

5. The method according to claim 1, further comprising:
    grouping the pixels in the frame into pixel blocks, and wherein
    the selecting comprises selecting a pixel block through which the path passes, from among the pixel blocks, using geometric information of each of the pixel blocks.

6. The method according to claim 5, wherein the geometric information of each of the pixel blocks comprises:
    information corresponding to edges of each of the pixel blocks or information corresponding to the vertices of each of the pixel blocks.

7. The method according to claim 5, wherein the selecting further comprises:
    dividing a pixel block through which the path passes into sub-blocks; and
    selecting a sub-block through which the path passes from among the sub-blocks using geometric information of each of the sub-blocks.

8. The method according to claim 1, wherein the calculating the winding number of the selected pixel further comprises:
    calculating the winding numbers of each of the sub-samples based on a position of each of the sub-samples and a position and a traveling direction of the path; and
    the combining the calculated winding numbers of the sub-samples includes calculating a path rotation direction count for the selected pixel based on the combined winding numbers of the sub-samples.

9. A computer program embodied on a non-transitory computer readable medium, the computer program causing at least one processor to perform the method according to claim 1.

10. An apparatus to perform path rendering, comprising:
a memory having computer readable instructions stored thereon; and
at least one processor configured to execute the computer readable instructions to,
select a pixel through which a path passes from among pixels included in a frame, using geometric information of the pixels in the frame,
set sub-samples for the selected pixel, each of the sub-samples being a point to be set with the selected pixel, and
calculate a winding number of the selected pixel using the sub-samples, the calculating the winding number of the selected pixel including,
calculating a winding number of each of the sub-samples, and
combining the winding numbers of the sub-samples,
wherein the selecting the pixel through which the path passes includes selecting the pixel based on whether winding numbers calculated at vertices of each of the pixels in the frame are the same.

11. The apparatus according to claim 10, wherein the at least one processor is further configured to:
select the pixel through which the path passes using information corresponding to edges of each of the pixels in the frame.

12. The apparatus according to claim 11, wherein the at least one processor is further configured to:
select the pixel through which the path passes based on whether the edges included in each of the pixels in the frame form intersections with the path.

13. The apparatus according to claim 10, wherein the at least one processor is further configured to:
select the pixel through which the path passes based on information corresponding to the vertices of each of the pixels in the frame.

14. The apparatus according to claim 10, wherein the at least one processor is further configured to:
group pixels in the frame into pixel blocks; and
select a pixel block through which the path passes, from among the pixel blocks, using geometric information of each of the pixel blocks.

15. The apparatus according to claim 14, wherein the geometric information of each of the pixel blocks comprises:
information corresponding to edges of each of the pixel blocks or information corresponding to the vertices of each of the pixel blocks.

16. The apparatus according to claim 14, wherein the at least one processor is further configured to:
divide a pixel block through which the path passes into sub-blocks; and
select a sub-block through which the path passes from among the sub-blocks using geometric information of each of the sub-blocks.

17. The apparatus according to claim 10, wherein the at least one processor is further configured to:
calculate the winding numbers of each of the sub-samples based on a position of each of the sub-samples and a position and a traveling direction of the path.

* * * * *